(12) United States Patent
Kimura et al.

(10) Patent No.: US 7,891,825 B2
(45) Date of Patent: *Feb. 22, 2011

(54) LIGHT SOURCE UNIT AND PROJECTION TYPE IMAGE DISPLAY APPARATUS HAVING THE SAME

(75) Inventors: Nobuyuki Kimura, Yokohama (JP); Satoshi Nakayama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/644,168

(22) Filed: Dec. 22, 2009

(65) Prior Publication Data

US 2010/0097583 A1 Apr. 22, 2010

Related U.S. Application Data

(63) Continuation of application No. 11/451,327, filed on Jun. 13, 2006.

(30) Foreign Application Priority Data

Jun. 17, 2005 (JP) ............................. 2005-177127

(51) Int. Cl.
*F21V 7/00* (2006.01)
*F21V 7/06* (2006.01)
*F21V 7/07* (2006.01)
*F21V 7/08* (2006.01)
*F21V 7/09* (2006.01)
*F21V 7/10* (2006.01)
*F21V 7/20* (2006.01)
*F21V 13/02* (2006.01)

(52) U.S. Cl. ............................. 353/99; 353/98; 362/342

(58) Field of Classification Search ................... 353/98; 362/296.01, 296.02, 296.03, 296.04, 296.05, 362/296.06, 296.07, 296.09, 269.1
See application file for complete search history.

(56) References Cited

U.S. PATENT DOCUMENTS

| | | | |
|---|---|---|---|
| 5,142,387 A * | 8/1992 | Shikama et al. ................ | 349/9 |
| 5,826,959 A | 10/1998 | Atsuchi | |
| 2005/0024880 A1* | 2/2005 | Moench et al. ............. | 362/342 |
| 2005/0083494 A1* | 4/2005 | Hashizume .................. | 353/98 |

FOREIGN PATENT DOCUMENTS

| | | |
|---|---|---|
| JP | 06-289394 | 10/1994 |
| JP | 09-120067 | 5/1997 |
| JP | 10-171045 | 6/1998 |
| JP | 11-281923 | 10/1999 |

OTHER PUBLICATIONS

U.S. Appl. No. 11/451,327, filed Jun. 13, 2006, Nobuyuki Kimura et al., Hitachi, Ltd.

* cited by examiner

*Primary Examiner*—Georgia Y Epps
*Assistant Examiner*—Bao-Luan Le
(74) *Attorney, Agent, or Firm*—Antonelli, Terry, Stout & Kraus, LLP.

(57) ABSTRACT

First and second reflectors are provided. The first reflector has a function of reflecting a light ray emitted from a light source and directing it toward an image display element and the second reflector has a function of changing the direction of a light ray so as to be reflected by the first reflector which light ray is emitted from the light source and not reflected by the first reflector. An outer periphery shape of the second reflector is changed correspondingly to an effective area of a first array lens 10.

7 Claims, 9 Drawing Sheets

US 7,891,825 B2

LIGHT SOURCE UNIT AND PROJECTION TYPE IMAGE DISPLAY APPARATUS HAVING THE SAME

CROSS-REFERENCE TO RELATED APPLICATIONS

This application is a continuation of application Ser. No. 11/451,327, filed on Jun. 13, 2006, now allowed, which claims the benefit of Japanese Application No. 2005-177127, filed Jun. 17, 2005 in the Japanese Patent Office, the disclosures of which are incorporated herein by reference.

BACKGROUND OF THE INVENTION

There is known a projection type image display apparatus such as a liquid crystal projector wherein light emitted from a light source such as an electric lamp is directed to an image display element such as a liquid crystal panel and an optical image formed on the image display element is projected on a larger scale. In this type of a projection type image display apparatus, light emitted from a light source is subjected to light intensity modulation for conversion into light and shade for each pixel in an image display element and an optical image formed is projected to a screen disposed on the front side or from the back side of a screen thereto. Such an image display apparatus is described, for example, in Japanese Patent Laid-open Nos. 10-171045 and 11-281923.

The mainstream of a light source used in the projection type image display apparatus is such that light emitted from the lamp is reflected by a reflector 2 which is disposed so as to cover the lamp from the back side and is then outputted to the image display element side. Such a light source, however, provides a light ray component that is not incident on the reflector but is radiated from an opening side of the reflector. Thus, satisfactory light utilization efficiency is not obtained. Such a loss can be compensated for by making the reflector large in size. In this case, however, an increase in size of the light source, i.e., an increase in size of the projection type image display apparatus, results and it is impossible to meet the market demand for reduction in size.

As means for attaining the reduction of size while improving the light utilization efficiency, a method (hereinafter referred to as the "double reflector method") is described in, for example, Japanese Patent Laid-open No. 6-289394 wherein a second reflector is disposed in the direction of light radiated from the reflector opening side and in proximity to a lamp.

The light source used in the double reflector method disclosed in Japanese Patent Laid-open No. 6-289394 includes a lamp, a reflector which covers the lamp from the back side and which reflects light incident from the lamp to an image display element side (opening side), and a sub-reflector disposed in proximity to the front side of the lamp. The sub-reflector reflects light incident from the lamp to the reflector side. For example, the sub-reflector may be a reflective film formed on an outer surface of a tubular bulb located on the side opposite to the reflector side of the lamp.

Light rays in the double reflector type are classified broadly into two, which are a light ray L3 incident on the reflector from the lamp and goes out after being reflected by only the reflector and a light ray L6 incident on the sub-reflector from the lamp and goes out after being reflected by the sub-reflector and subsequently reflected by the reflector. The light ray L6 is further classified into two light rays L7 and L8. L7 is a light ray which, in the absence of the sub-reflector, does not enter the reflector, but radiates from the opening portion of the reflector without advancing toward (without becoming incident on) integrator means, the integrator means being for uniforming a light quantity distribution, or even after being incident on and reflected by the reflector, doe not advance toward (does not become incident on) the integrator means and thus becomes invalid. L8 is an effective light ray which, even in the absence of the sub-reflector, is reflected by the reflector and advances toward (becomes incident on) the integrator means. Thus, L7 is a light ray which can be utilized effectively by adopting the double reflector method. In the following description it is assumed that the light ray 3 includes a light ray that, in the absence of the sub-reflector, enters the reflector, then is reflected by the reflector and advances toward the integrator means.

SUMMARY OF THE INVENTION

However, in the double reflector method, a portion of the effective light ray L3 which, in the absence of the sub-reflector, enters the reflector from the light source and is reflected by the reflector becomes incident on the reflector after being reflected by the sub-reflector. Usually, the reflector and the sub-reflector are each formed using a material high in reflectance, but the reflectance of the sub-reflector cannot be made 100% because there does not exist such an ideal material as having a reflectance of 100%. Therefore, despite the light ray having so far been once reflected by the reflector and thereafter entering a first array lens, since there is adopted the construction wherein the light ray goes through reflection by the sub-reflector before incidence on the reflector, there arises a problem in that the utilization efficiency of light is deteriorated by an amount corresponding to the amount of light ray not reflected by the sub-reflector.

It is an object of the present invention to diminish the light ray reflected by the sub-reflector out of effective light rays which, even in the absence of the sub-reflector, are emitted from a lamp, then are reflected by the reflector and advance toward (become incident on) the integrator means, thereby improving the utilization efficiency of light.

In one aspect of the present invention there are provided a first reflector that reflects a light ray emitted from a light source and directs it toward an image display element and a second reflector that changes the direction of a light ray emitted from the light source and not reflected by the first reflector into a direction permitting the light ray to be reflected by the first reflector, and the shape of an outer periphery of the second reflector is changed correspondingly to an effective area of a first array lens 10.

BRIEF DESCRIPTION OF THE DRAWINGS

Other objects and advantages of the invention will become apparent from the following description of embodiments with reference to the accompanying drawings in which.

DETAILED DESCRIPTION OF PREFERRED EMBODIMENTS

Figure 3:
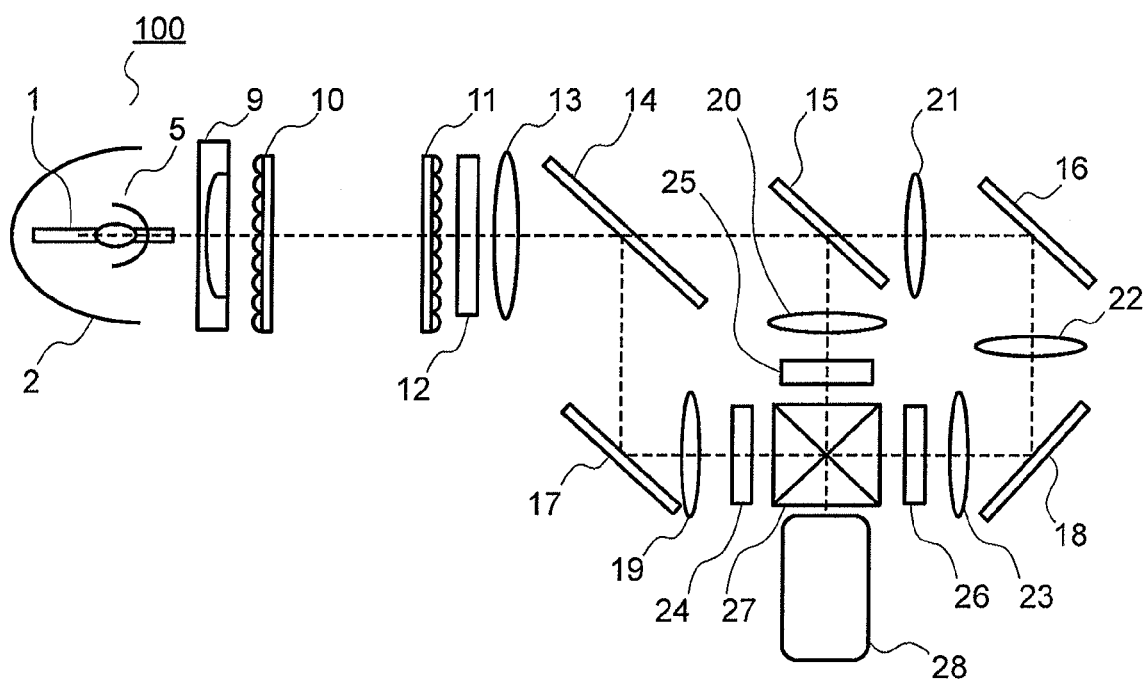
FIG. 3 is a schematic construction diagram showing an example of an optical system in a projection type liquid crystal display apparatus.

Preferred embodiments of the present invention will be described hereinunder with reference to the drawings. In the drawings, the same portions are identified by the same reference numerals, and as to portions once explained, repeated explanations thereof will be omitted. FIG. 3 is a schematic construction diagram of an optical system used in a projection type liquid crystal display apparatus according to an embodiment of the present invention.

In FIG. 3, a lamp 1, a sub-reflector 5 and a reflector 2 constitute a light source 100 of the double reflector type. The lamp 1 is a white lamp such as, for example, an ultra-high pressure mercury vapor lamp, a metal halide lamp, a xenon lamp, a mercury xenon lamp, or a halogen lamp. The reflector 2 has a spheroidal reflective surface disposed so as to cover the lamp 1 from the back side and having a circular or polygonal output opening. The reflector which serves as a first reflector is disposed on the side opposite to a first array lens 10 with respect to the lamp. Further, a sub-reflector 5 is disposed on the side opposite to the reflector 2, i.e., between the lamp 1 and the first array lens 10 so as to be in proximity to the lamp 1. The sub-reflector which serves as a second reflector is for reflecting light emitted from the lamp toward the reflector. For example, the sub-reflector may be a reflective film formed on the outer surface of a tubular bulb of the lamp on the side opposite to the reflector. Light emitted from the light source 100 passes through liquid crystal display elements 24, 25 and 26 which are light valve elements, advances toward a projection lens 28 and is projected onto a screen (not shown).

Light emitted from the lamp 1 is reflected by the reflector having, for example, a spheroidal reflective surface to become convergent light, then passes through a collimator lens 9 to become parallel light to the optical axis, and then the thus-collimated light is directed to the first array lens 10. A portion of the light emitted from the lamp is reflected by the sub-reflector 5 and is incident on the first array lens 10 via the reflector 2. In the first array lens 10, the light incident thereon from the light source 100 is split into plural light beams by plural lens cells arranged in a matrix shape, which are then directed so as to pass through a second array lens 11 and a polarization transducer 12 efficiently. The first array lens 10 is designed so that the lamp 1 and the lens cells of the second array lens 11 are in an object-image relation (conjugate relation) with each other. In the second array lens 11 having plural lens cells arranged in a matrix shape, like the first array lens 10, constituent lens cells project (map) the shapes of corresponding lens cells of the first array lens 10 onto the liquid crystal display elements 24, 25, and 26. At this time, the light beams outputted from the second array lens 11 are made uniform in a predetermined polarization direction and projection images of the lens cells of the first array lens 10 are superimposed on the liquid crystal display elements 24, 25 and 26 through condenser lenses 13, 19, 20, a first relay lens 21, a second relay lens 22, and a third relay lens 23. The second array lens 11 and the condenser lens 13 disposed in proximity thereto are designed so that the lens cells of the first array lens 10 and the liquid crystal display elements 24, 25, 26 are in an object-image relation (conjugate relation) with each other. Therefore, the plural light beams split by the first array lens 10 are projected in a superimposed manner on the liquid crystal display elements 24, 25 and 26 by the second array lens 11 and the condenser lens 13, thus ensuring illumination of a highly uniform illuminance level free of any problem in practical use.

During this projecting process, with a dichroic mirror 14, for example, B light (blue-band light) is reflected, while G light (green-band light) and R light (red-band light) are transmitted and split into light beams of two colors. For example, G light is reflected by the dichroic mirror 15, while R light passes through a dichroic mirror 15 and is split into light beams of three colors. How to split light may be conceivable in various ways. For example, R light may be reflected by the dichroic mirror 14, while G light and B light may be allowed to pass through the same mirror, or G light may be reflected by the dichroic mirror 14, while R light and B light may be allowed to pass through the same mirror. As an example, B light is reflected by the dichroic mirror 14, then by a reflecting mirror 17, passes through the condenser lens 19, further passes through the liquid crystal display element 24 for B light, and enters a photosynthesis prism 27. Of the G light and R light having passed through the dichroic mirror 14, the G light is reflected by the dichroic mirror 15, then passes through the condenser lens 20, enters the liquid crystal display element 25 for G light, then passes through the liquid crystal element 25 and enters the photosynthesis prism 27. On the other hand, the R light passes through the dichroic mirror 15, is condensed by the first relay lens 21, reflected by a reflecting mirror 16, further condensed by the second relay lens 22, reflected by a reflecting mirror 18, further condensed by the third relay lens 23, and enters the liquid crystal display element 26 for R light. The R light having passed through the liquid crystal display element 26 enters the photosynthesis prism 27. The B light, G light and R light having passed through the liquid crystal elements are synthesized into a color image by the photosynthesis prism 27, then passes through a projection lens, e.g., zoom lens, and reaches a screen (not shown). Optical images formed by light intensity modulation on the liquid crystal display elements 24, 25 and 26 are projected on a larger scale onto the screen by the projection lens 28, thus functioning as a display.

Relay lenses for making the optical path length equal to that of B light and that of G light are used in the third optical path (R light) although no relay lens is used in the first optical path (B light) and the second optical path (G light).

The first array lens 10, the second array lens 11 and the condenser lens 13 constitute an optical integrator. Since the display area of each liquid crystal display element is rectangular, the shape of each lens cell in at least the first array lens 10 is made rectangle analogously to that of the display area. A peripheral edge shape formed by joining the outermost peripheries of assembled lens cells as constituents of the first array lens 10 which split the light from the light source into plural light beams will hereinafter be referred to as "effective outline of the first array lens 10" for convenience. Only the light that has entered an effective area surrounded with the effective outline of the first array lens 10 is directed onto the image display elements. It follows that the utilization efficiency of light is improved by introducing the light from the light source into the effective area surrounded with the effective outline of the first array lens 10.

Figure 2:
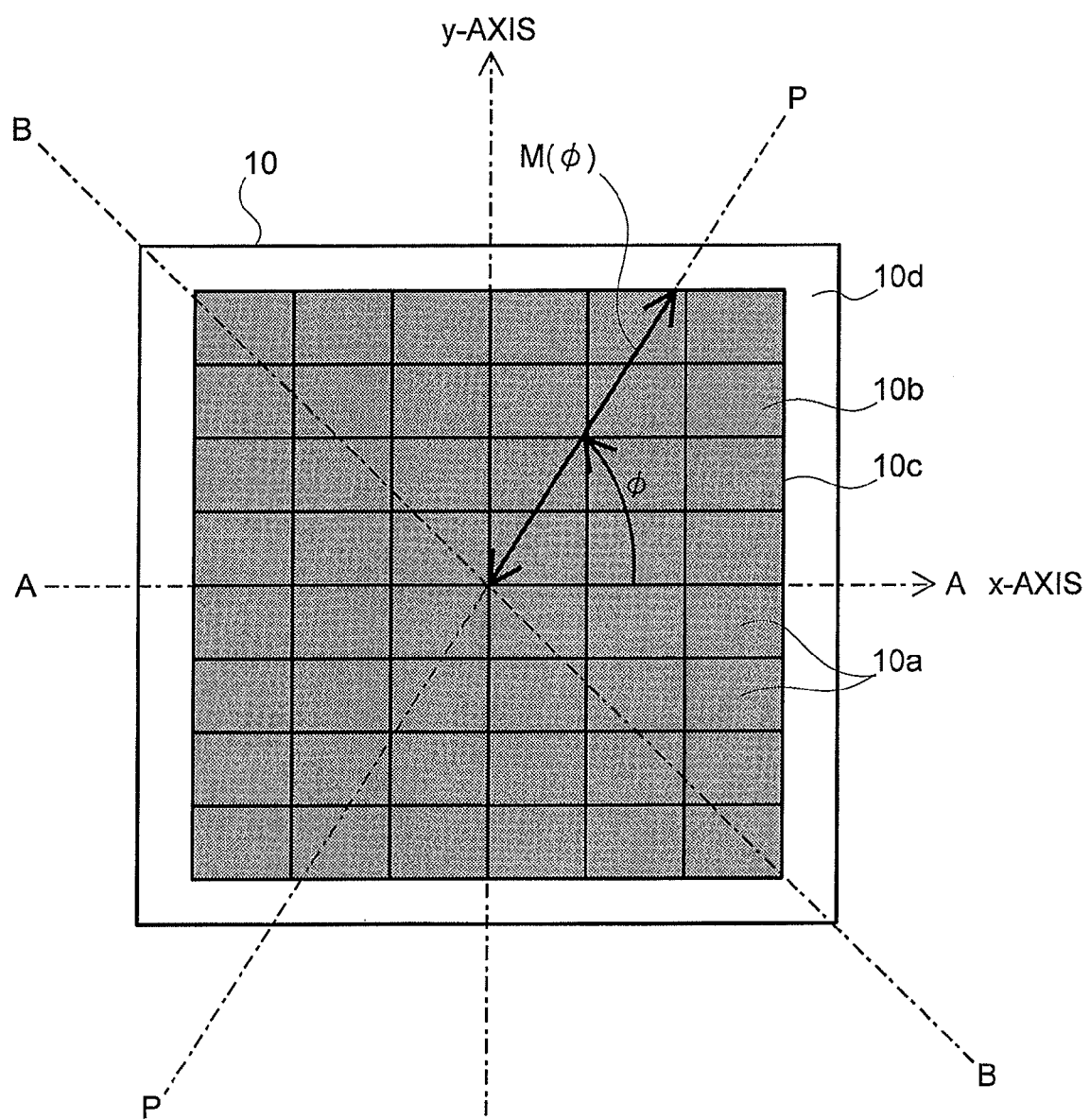
FIG. 2 is a diagram explaining a construction of the first array lens.

The effective outline of the first array lens 10 is generally rectangular as shown in FIG. 2 of Japanese Patent Laid-open No. 10-171045. However, various other shapes are employable according to optical designs. For example, there is known a lens cell assembly shape with lens cells arranged so as to fill up a circle, as shown in FIG. 2 of Japanese Patent Laid-open No. 11-281923. In the following description, for ease of explanation, the effective outline of the first array lens is assumed to be rectangular. However, it goes without saying that the present invention is not limited thereto, but that the invention is applicable also to any of first array lenses not circular in effective outline. It is when the first array lens differs in diameter depending on an azimuth angle that this embodiment is particularly effective.

The reason why the utilization efficiency of light is improved by this embodiment will be described below with reference to drawings.

Figure 1A:
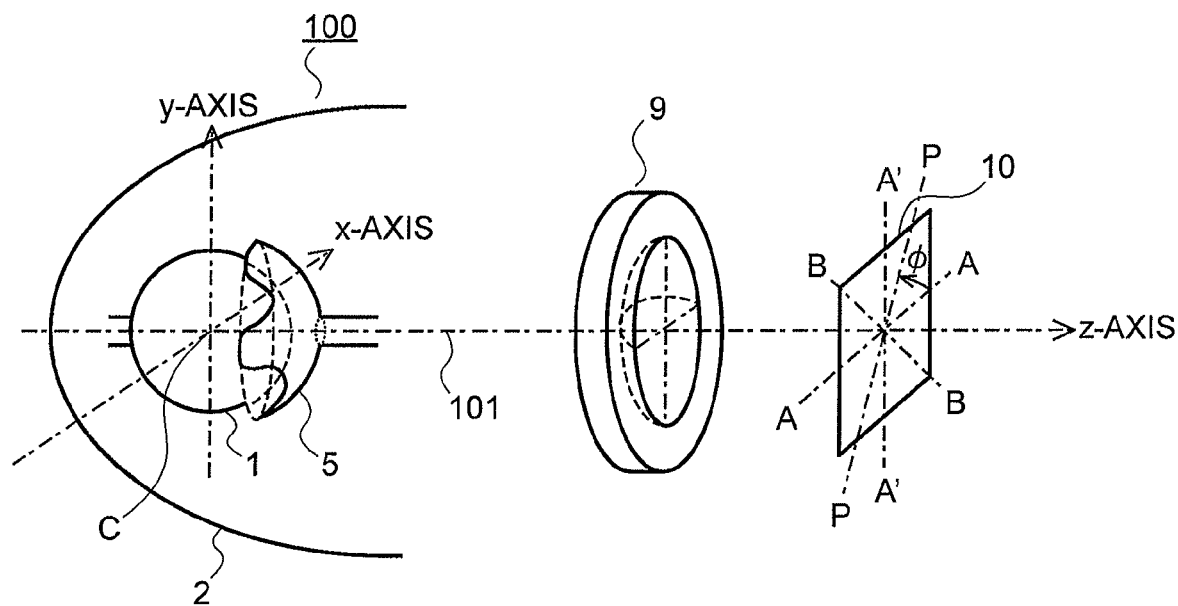
FIG. 1 is a perspective view showing a principal portion of an example of an optical system from a light source up to a first array lens in an embodiment of the present invention.
Figure 1B:
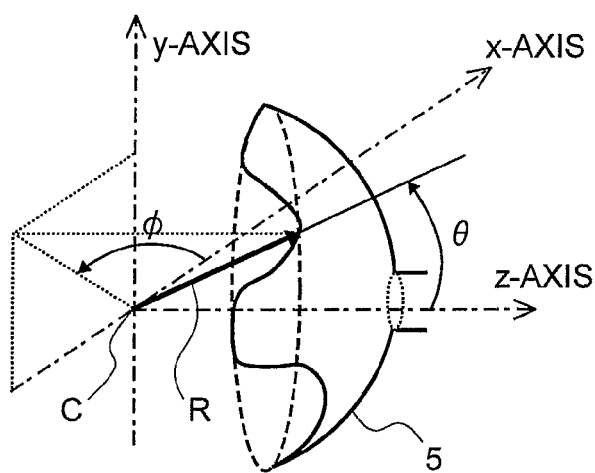

First, to facilitate the following explanation, a right-hand orthogonal coordinate system is introduced using FIGS. 1A and 1B. FIG. 1A is a partial perspective view showing on a larger scale the lamp light source 1, reflector 2, sub-reflector 5, collimator lens 9 and first array lens 10 shown in FIG. 3, which are principal constituent portions related to this embodiment. For the first array lens 10, the foregoing effective area with lens cells present therein is shown.

In FIGS. 1A and 1B the following is assumed: A light emission center C of the lamp 1 is an origin. The direction of an optical axis 101 which extends from the point C as the origin and on which the integrator (the first array lens 10) is present is a z-axis. In a plane perpendicular to the Z-axis the axis in A-A direction (parallel to one side direction of the rectangular lens cells of the first array lens 10) passing through the point C and parallel to one side of the rectangular effective outline of the first array lens 10 is an x-axis. Lastly, the axis in A'-A' direction (parallel to the other side direction orthogonal to one side of the rectangular lens cells of the first array lens 10) passing through the point C and running parallel to the other side orthogonal to one side of the rectangular effective outline of the first array lens 10 is a y-axis. To define the shape of an effective outline of the sub-reflector 5, three-dimensional polar coordinates with the point C as the origin are introduced, as shown in FIG. 1B. That is, it is assumed that the distance (radius) from the point C up to an outline point of the sub-reflector 5 is R, the angle of deviation (hereinafter referred to as "polar angle") between the z-axis and the outline point of the sub-reflector 5 is $\theta$ ($0 \leq \theta \leq \pi$), and the angle of deviation ("azimuth angle") between the x-axis and the outline point of the sub-reflector 5 is $\phi$ ($0 \leq \phi \leq 2\pi$).

Now, the outline shape of the effective area of the first array lens 10 will be explained with use of a diagram of a prevalent array lens. FIG. 2 is a diagram of the first array lens 10 as viewed from the output side in the optical axis direction. The first array lens 10 is usually made up of a shaded portion wherein rectangular lens cells 10a substantially analogous to the image display elements are arranged in a matrix shape (two-dimensional shape) and a flat portion 10d surrounding them. Light incident on the lens cells 10a is superimposed on the image display elements and is then projected onto the screen by the projection lens. Light incident on the flat portion 10d cannot reach the screen. The shaded portion with lens cells present therein is designated an effective area 10b of the array lens. Although the effective area 10b is rectangular in FIG. 2, no limitation is made thereto.

Coordinates similar to that of FIG. 1 can be set in the following manner. An X axis of an orthogonal coordinate system is disposed in parallel with the longitudinal direction of the lens cells of the first array lens 10 and the direction thereof is assumed to be A-A direction. Next, the direction in which the distance ("effective diameter" hereinafter) from the optical axis to the outermost periphery (effective outline 10c) of the effective area 10b of the first array lens 10 is the longest is assumed to be B-B direction. The direction of an arbitrary azimuth angle $\phi$ from A-A direction (X axis) is assumed to be P-P direction. In P-P direction, the effective diameter is assumed to be M($\phi$). That is, the effective diameter M($\phi$) which represents an effective outline of the first array lens 10 is defined as a function of the azimuth angle $\phi$. On the basis of these pieces of information a description will be given below about an optimum shape of the sub-reflector in the double reflector method.

Figure 4A:
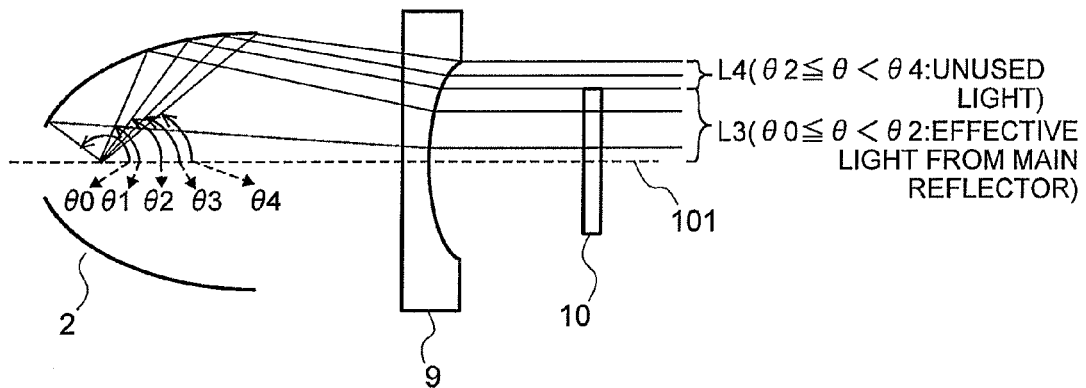
FIG. 4 is a sectional view showing a principal portion of an example of an optical system from a light source up to a first array lens used in a conventional method.
Figure 4B:
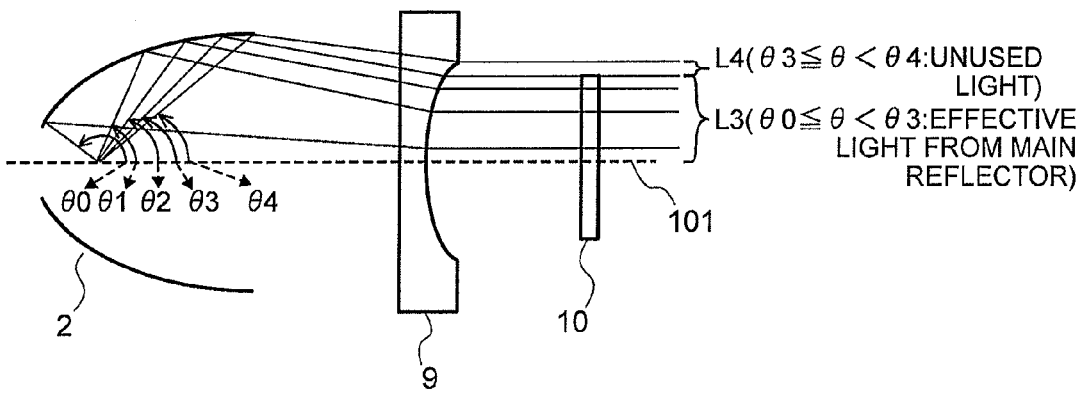
Figure 4C:
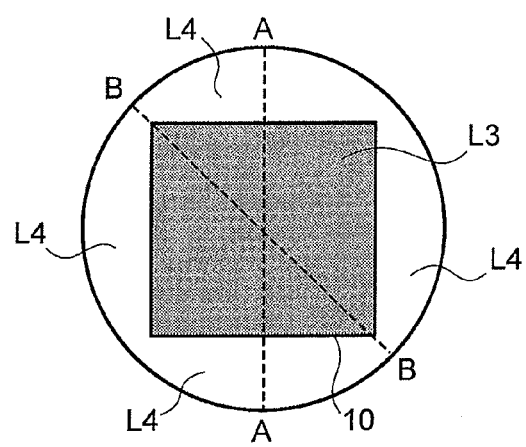

FIGS. 4A, 4B and 4C represent typical light rays in sections in the absence of a sub-reflector, in which FIG. 4A is a light ray diagram along A-A section including an optical axis, FIG. 4B is a light ray diagram along B-B section including an optical axis, and FIG. 4C illustrates a light ray distribution in the first array lens.

In FIG. 4, the angles of light rays relative to an optical axis 101 are assumed to be $\theta 0$, $\theta 1$, $\theta 2$, $\theta 3$ and $\theta 4$ in descending order. From the A-A section of FIG. 4A it is seen that light rays up to $\theta 0 \leq \theta < \theta 2$ in light ray angle are reflected by the reflector 2 and directed onto the first array lens 10 and are thus effective light rays ("effective light" hereinafter) L3. Light rays up to $\theta 2 \leq \theta < \theta 4$ in light ray angle are reflected by the reflector 2, but not directed onto the first array lens 10, and are thus unused light rays ("unused light" hereinafter) L4.

On the other hand, in the B-B section of FIG. 4B in a diagonal direction, light rays up to $\theta 0 \leq \theta < \theta 4$ are reflected by the reflector 2 and directed onto the first array lens 10 and thus correspond to the effective light L3. Light rays up to $\theta 3 \leq \theta < \theta 4$ in light range angle are reflected by the reflector 2, but are not directed onto the first array lens 10, and thus correspond to the unused light L4. That is, when a comparison is made between the A-A direction and the diagonal direction in which the distance (effective diameter) from the optical axis of the first array lens 10 to the effective outline is long (far), it is seen that the light rays of $\theta 2 \leq \theta < \theta 3$ in light ray angle become unused light. This is a different point from the above A-A section.

As is apparent from FIG. 4C, the light beam that outputs after being reflected by the reflector 2 having a circular opening becomes a circular light beam. Therefore, if the size of the reflector 2 is determined so as to cover the first array lens 10, the unused light L4 not incident on the effective area is much distributed on the surface of the first array lens 10 and thus satisfactory utilization efficiency of light cannot be obtained. In particular, in the A-A direction in which the distance (effective diameter) from the optical axis is short, the unused light L4 is much distributed as compared with the diagonal B-B direction in which the distance (effective diameter) from the optical axis is long (far).

Figure 5A:
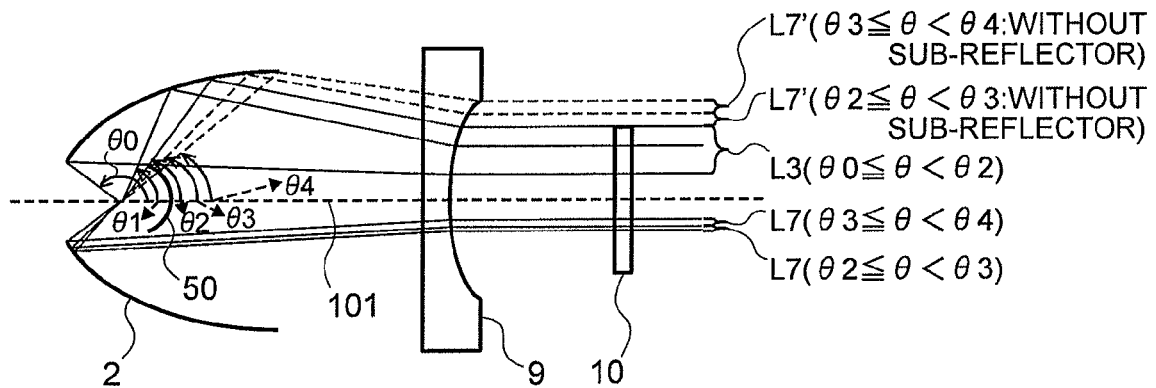
FIG. 5 is a sectional view of a principal portion of an optical system from a light source up to a first array lens used in a conventional double reflector method.
Figure 5B:
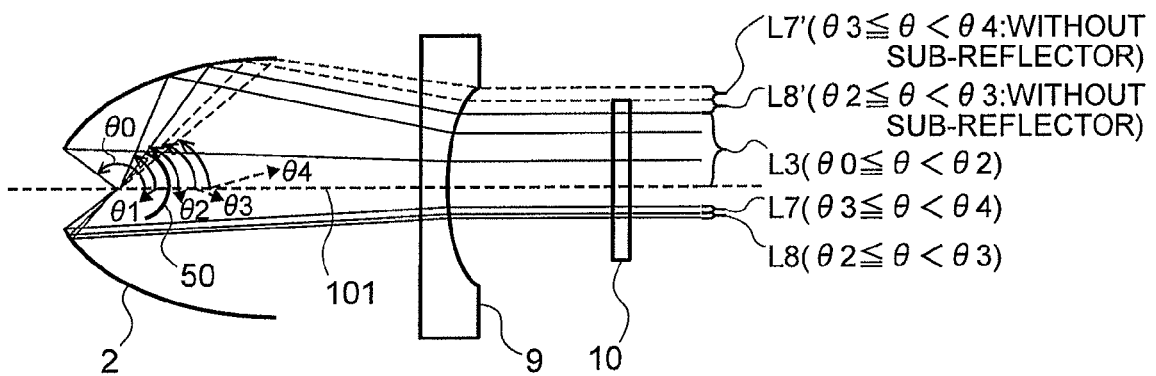
Figure 5C:
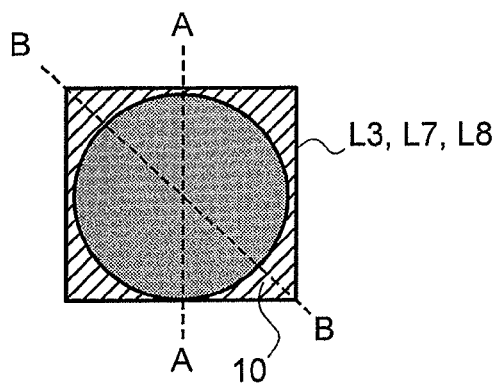
Figure 5D:
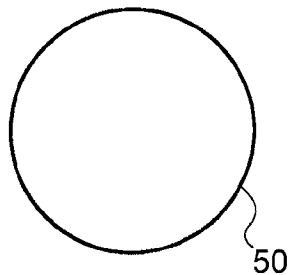

FIGS. 5A to 5D represent typical light rays in sections obtained when a sub-reflector of a prevalent shape is disposed with a light emission center as an origin. FIG. 5A is a light ray diagram in A-A section including an optical axis, FIG. 5B is a light ray diagram in B-B section including an optical axis, FIG. 5C illustrates a light ray distribution in the first array lens, and FIG. 5D illustrates a sub-reflector 50 as viewed directly from the lamp center, the sub-reflector 50 being in a conventional circular shape.

In the A-A section of FIG. 5A, light rays up to $\theta 0 \leq \theta < \theta 2$ in light ray angle are reflected by the reflector 2 and directed onto the first array lens 10, serving as effective light L3. Light rays of $\theta 2 \leq \theta < \theta 3$ and $\theta 3 \leq \theta < \theta 4$ in light ray angle are reflected by the sub-reflector 50, then are reflected by the reflector 2 and are directed onto the first array lens 10, serving as effective light L7. In the absence of the sub-reflector 50, as indicated by dotted lines in FIG. 5A, the effective light L7 of $\theta 2 \leq \theta < \theta 3$ and $\theta 3 \leq \theta < \theta 4$ in light ray angle is not directed onto the first array lens 10 and thus becomes unused light.

In the B-B section of FIG. 5B, light rays up to $\theta 0 \leq \theta < \theta 2$ in light ray angle are reflected by the reflector 2 and incident on the first array lens 10, serving as effective light L3. Light rays up to $\theta 2 \leq \theta < \theta 3$ in light ray angle are reflected by the sub-reflector 50, then are reflected by the reflector 2 and incident on the first array lens 10, serving as effective light L8. In the absence of the sub-reflector 50, as indicated by dotted lines in FIG. 5B, the effective light L8 of up to $\theta 2 \leq \theta < \theta 3$ is reflected by the reflector 2 and directed onto the first array lens 10. Light rays up to $\theta 3 \leq \theta < \theta 4$ are reflected by the sub-reflector 50, then reflected by the reflector 2 and directed onto the first array lens 10, serving as effective light L7. In the absence of the sub-reflector 50, the effective light L7 of up to $\theta 3 \leq \theta < \theta 4$ is not incident on the first array lens 10 and is thus unused light.

A comparison between the A-A section and the B-B section shows that the light up to $\theta 3 \leq \theta < \theta 4$ in light ray angle can be changed from unused light to effective light because the sub-reflector 50 is present. In the A-A section, the light in the region of $\theta 2 \leq \theta < \theta 3$ can be made effective light because of the presence of the sub-reflector 50 in comparison with the case where the sub-reflector is absent. On the other hand, in the B-B section, the light in the region of $\theta 2 \leq \theta < \theta 3$ is effective light irrespective of the presence or absence of the sub-reflector 50. In this point the B-B section is different from the A-A section. That is, in the absence of the sub-reflector 50, the light in this region is reflected by the reflector 2 and thus serves as effective light. Also in the presence of the sub-reflector 50, the light in question becomes effective light as a result of being reflected by both sub-reflector 50 and reflector 2. This is because in the B-B section the effective diameter of the first array lens is larger than that in the A-A section and therefore in the B-B section the light can become effective light even in the absence of the sub-reflector.

On the surface of the first array lens 10 shown in FIG. 5C, as described above, all light rays are directed onto the effective area of the first array lens 10, with no incidence of light rays on the exterior of the effective area. Thus, it is seen that the utilization efficiency of light is greatly improved in comparison with the case where the sub-reflector 50 is not present. As shown in FIG. 5C, by adjusting the diameter of the reflector and that of the sub-reflector, the area formed by incident light rays can be received within the size of the first array lens 10. However, the effective light (light rays of $\theta 2 \leq \theta < \theta 3$ in light ray angle) in B-B direction reflected by the reflector 2 and directed onto the first array lens 10 in the absence of the sub-reflector 50 is reflected by the sub-reflector 50 because of the presence of the sub-reflector, further reflected by the reflector and directed onto the first array lens 10. Thus, since the reflectance of the sub-reflector is not 100%, the spectral utilization efficiency of non-reflected light is deteriorated. In FIG. 5C, a hatched portion on the first array lens 10 indicates a portion wherein, because of the presence of the sub-reflector, light that has so far been effective light through reflection by only the reflector 2, is now effective light through the total of twice reflections by the sub-reflector 50 and the reflector 2.

In this embodiment, light rays are made incident also on the four corners in diagonal directions of the effective area of the first array lens 10 while preventing the effective light L8 in a diagonal direction (e.g., B-B direction) in FIG. 5 from being reflected by the sub-reflector. By so doing, the effective light L8 is not reflected by the sub-reflector and therefore its spectral utilization efficiency is improved.

Accordingly, in this embodiment, the peripheral edge shape of the sub-reflector is recessed near an angular (φ) direction (e.g., the diagonal B-B direction if the effective outline shape of the first array lens is generally rectangular) in which the effective diameter of the first array lens on the surface of the same lens is long.

Figure 6A:
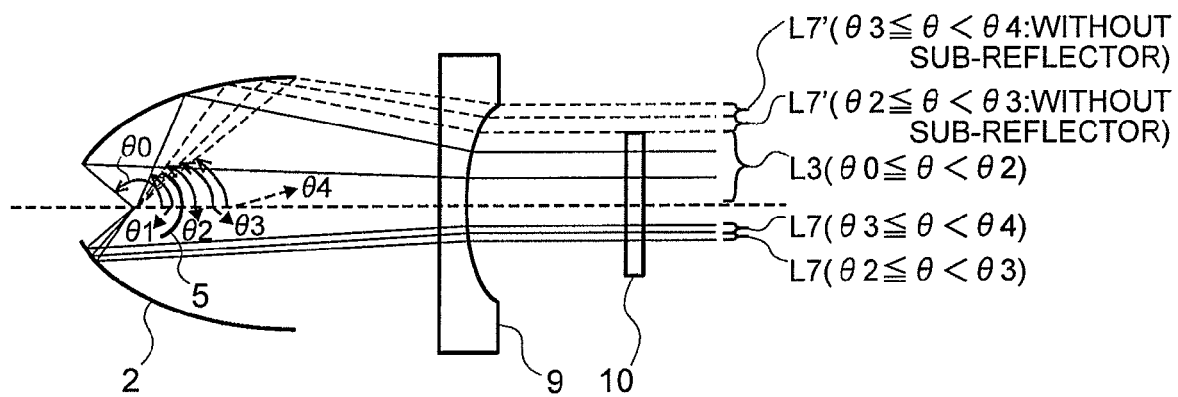
FIG. 6 is a sectional view showing a principal portion of an example of an optical system from a light source up to a first array lens.
Figure 6B:
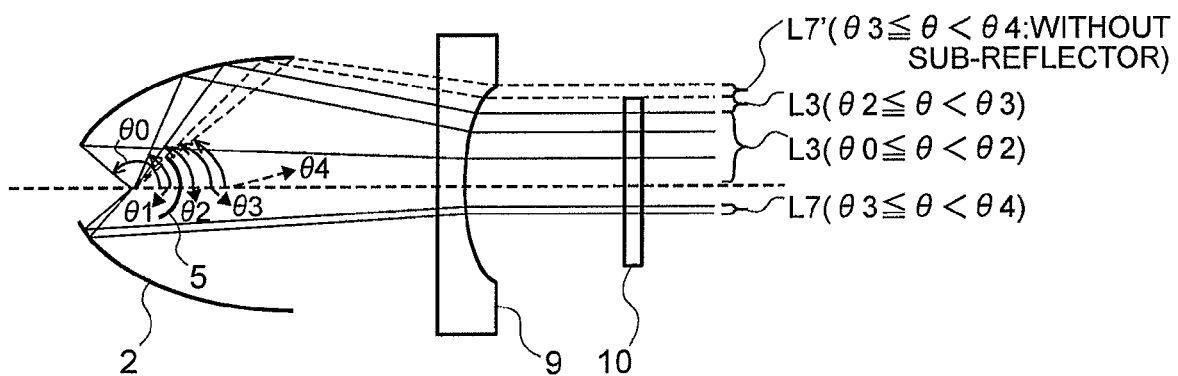
Figure 6C:
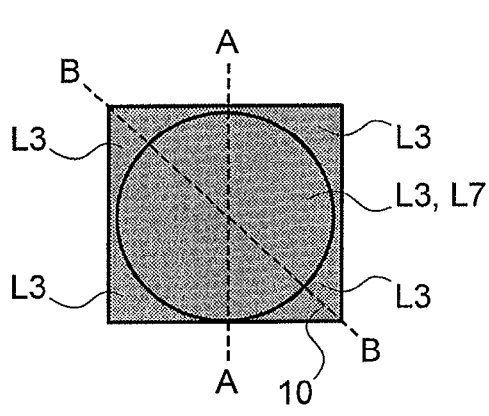
Figure 6D:
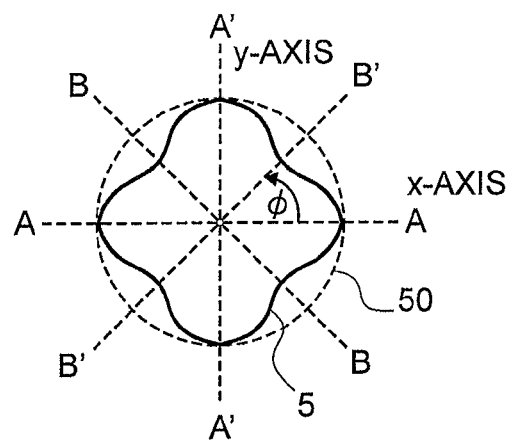

FIGS. 6A to 6D represent typical light rays in sections obtained when a sub-reflector of a shape corresponding to the effective outline of the first array lens 10 according to this embodiment is disposed with the light emission center as an origin. FIG. 6A is a light ray diagram taken along A-A section including an optical axis, FIG. 6B is a light ray diagram taken along B-B section including an optical axis, FIG. 6C illustrates a light ray distribution in the first array lens, and FIG. 6D illustrates the sub-reflector 5 as seen directly from the lamp center.

FIG. 6D depicts a diagonal B-B direction as an angular (φ) direction and an A-A direction as an angular (φ) direction in a mutually superimposed manner. In the diagonal B-B direction, the distance (effective diameter) from the optical axis in the first array lens 10 is long and in the A-A direction, the distance (effective diameter) from the optical axis is short. As is apparent from FIG. 6D (or FIG. 1A), the periphery edge shape of the sub-reflector 5 corresponds to the effective outline of the first array lens 10 and is therefore different from a circular shape. In the vicinity of at least the diagonal B-B direction as the angular (φ) direction in which the effective length in the first array lens 10 is long and the other diagonal B'-B' direction, the peripheral edge shape of the sub-reflector 5 is recessed to prevent the light rays of θ2-θ3 in light ray angle shown in FIG. 6 from being reflected by the sub-reflector. On the other hand, in the vicinity of A-A direction as an angular (φ) direction in which the distance from the optical axis is short and A'-A' direction orthogonal to the A-A direction, the peripheral edge shape of the sub-reflector 5 is in contact with the peripheral edge shape (a circular shape indicated by a dotted line) of the conventional sub-reflector 50.

Consequently, the A-A section of FIG. 6A provides a light ray diagram similar to that of FIG. 5A. In the B-B section of FIG. 6B, unlike FIG. 5B, light rays of θ2-θ3 in light ray angle are reflected by the reflector 2 and directed onto the first array lens 10, serving as effective light L3. Since the light rays of θ2-θ3 in light ray angle are not reflected by the sub-reflector 5, the utilization efficiency of light is improved over that in FIG. 5.

Thus, it is seen that on the surface of the first array lens 10 in FIG. 5C all light rays are incident on the effective area of the first array lens 10 and that the utilization efficiency of light is greatly improved in comparison with that in the absence of the sub-reflector 5. In FIG. 5B the effective light L8 in B-B direction is reflected by the sub-reflector 50 whose reflectance is not 100%, then is reflected by the reflector 2 and directed onto the first array lens 10, while in FIG. 6B the same light is reflected directly by the reflector 2 and directed onto the first array lens 10. Thus, light that has been effective light even in the absence of the sub-reflector 5 can be improved in utilization efficiency of light by adopting the construction of eliminating reflection from the sub-reflector 5.

Since the first array lens is square in the illustration of FIG. 6, the same shape appears in both A-A and A'-A' directions, as shown in FIG. 6D. For example, however, when the effective area of the first array lens is rectangular, the value of θ is different between A-A direction and A'-A' direction. That is, when the A-A direction is a long side, in other words, the y-axis direction is a long side, and the A'-A' direction (x-axis direction) is a short side, the value of θ in x-axis direction is the largest, the value of θ in the y-axis direction is the next, and the value of θ in both B-B and B'-B' directions is the smallest. The magnitude of θ will be described later.

The peripheral edge shape of the sub-reflector 5 shown in FIG. 6D has been described above in only A-A (A'-A') and B-B (B'-B') directions. As is apparent from FIGS. 6A and 6B, however, a light ray may be determined which is emitted from the light emission center point C, reflected by the reflector 2 and directed onto the effective outline of the first array lens 10 with the azimuth angle φ as parameter and in P-P section including an optical axis at an arbitrary azimuth angle φ. In addition, for example points on a spherical surface of the same radius R as that of the sub-reflector 50 through which the light ray passes may be plotted. In this case, it is possible to obtain a predetermined peripheral edge shape of the sub-reflector 5 corresponding to the effective outline of the first array lens 10 (e.g., the peripheral edge shape of the sub-reflector 5 shown in FIG. 1). For example, this light ray corresponds to the light ray of a light ray angle of θ2 in FIG. 6A or to the light ray of a light ray angle of θ3 in FIG. 6B.

The method for determining the peripheral edge shape of the sub-reflector has been described above conceptually using light ray diagrams. Next, a description will be given about a method for determining a peripheral edge shape of the sub-reflector in the double reflector method according to this embodiment.

Figure 7A:
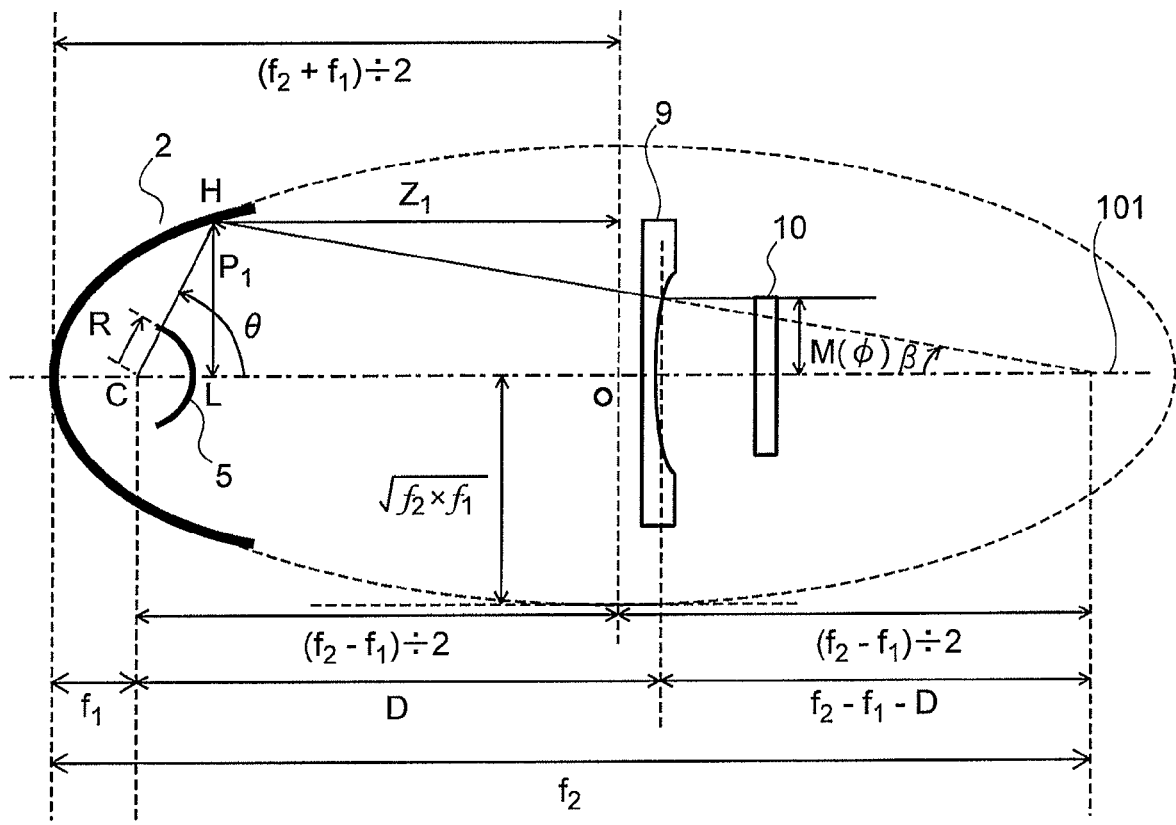
FIG. 7 is an explanatory diagram showing a peripheral edge shape of a sub-reflector according to a first embodiment.
Figure 7B:
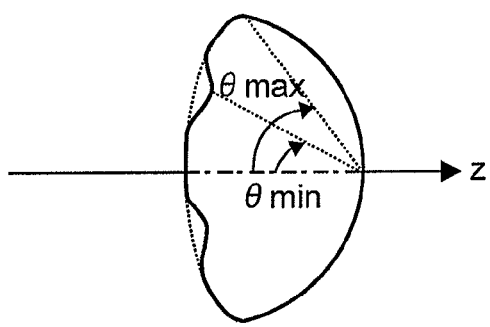

FIGS. 7A and 7B are light ray diagram taken along P-P section in FIG. 1. In FIG. 7A, the shape of the sub-reflector 5 is determined so that the light ray passing through the effective diameter of the first array lens 10 may pass through the outermost periphery of the effective area of the sub-reflector 5. By so doing, the light reflected by the reflector 2 and directed as effective light on the first array lens 10 is not reflected by the sub-reflector whose reflectance is not 100%, so that the utilization efficiency of light can be enhanced.

Now, in FIG. 7A, the light emission center of the lamp is assumed to be point C and coordinate axes x, y, z, θ, and φ are used which have been defined above in connection with FIG. 1. The following is assumed: First and second focal lengths of the reflector 2 are $f_1$ and $f_2$, respectively. The distance from the point C to the collimator lens 9 is D and the distance is $P_1$ which is from the optical axis to a point H at which the light ray passing through the outermost periphery of the sub-reflector 5 intersects the reflector 2. The foot of a perpendicular dropped from the point H to the optical axis 101 is a point L. The distance of the point L from an ellipse origin O of the reflector 2 is $Z_1$. The angle between the aforesaid light ray reflected at the point H and the optical axis 101 is β. Lastly, an effective diameter as the distance from the center of the first array lens 10 up to the effective outline through which light passes is M(φ). In this embodiment the shape of the reflector is spheroid. Therefore, in connection with the light emission center C, when the first focal length $f_1$ of the ellipse is thus defined, related parameters satisfy the following four equations (1), (2), (3) and (4):

$$M(\phi) = (f_2 - f_1 - D) \times \tan \beta \quad (1)$$

$$Z_1^2 \div \{(f_2 + f_1) \div 2\}^2 + P_1^2 \div (\sqrt{(f_2 + f_1)})^2 = 1 \quad (2)$$

$$P_1 = \{(f_2 - f_1) \div 2 - Z_1\} \times \tan \theta \quad (3)$$

$$\sin \beta = \sqrt{(P_1^2 + \{(f_2 - f_1) \div 2 - Z_1\}^2} = \sin \theta \div \sqrt{(P_1^2 + \{(f_2 - f_1) \div 2 + Z_1\}^2)} \quad (4)$$

From these four equations (1), (2), (3) and (4) it is possible to obtain a polar angle θ proportional to the effective diameter M(φ) of the first array lens 10.

That is, by determining coordinates $(Z_1, P_1)$ of the point H from equations (2) and (3), determining the angle β from Equation (1) and substituting them into equation (4), the polar angle θ can be obtained as a function of the azimuth angle φ. Then, by plotting the results on the spherical surface of the sub-reflector of radius R it is possible to obtain the shape of the peripheral edge outline of the sub-reflector 5.

For example, given that $f_1=10$ mm, $f_2=100$ mm, D=40 mm, a maximum value of the outermost effective diameter of the first array lens 10 is Mmax=18 mm, and a minimum value thereof is Mmin=15 mm, a maximum value θmax and a minimum value θmin of the polar angle are obtained. The results are that θmax=120.4° and θmin=111.5°. At this time, θmax÷θmin≈1.80. FIG. 7B shows the relationship between the shape of the peripheral edge outline of the sub-reflector and the polar angle θ. If θ is determined as a function of M(φ) with use of equations (1) and (4), θ becomes a function of $\sin^{-1}$ which is a reciprocal of M(φ). Therefore, θmin and θmax correspond to polar angles in a case of using Mmin and Mmax, respectively. In FIG. 7B, which shows this relation, θmin results as to the portion corresponding to the major diameter (Mmax) of the first array lens, i.e., as to the peripheral edge of the same angle φ' as the azimuth angle φ of the major diameter of the first array lens, while θmax results as to the peripheral edge of the same angle as the azimuth angle φ' of the minor diameter of the first array lens. Thus, in accordance with whether the diameter of the first array lens is long or short the polar angle of the opening portion in the peripheral edge outline of the sub-reflector 5 varies and cutout portions are formed. To put it the other way around, the polar angle of the peripheral edge outline of the sub-reflector 5 is set to a shallowest angle θmin permitting direct reflection of light from the light source by the reflector 2 and incidence on the major diameter (Mmax) of the first array lens, and thereafter the portion corresponding to the minor diameter (Mmin) of the first array lens forms an opening portion of a deep angle θmax. Alternatively, the diameter of the opening portion becomes long at the portion where the shape (peripheral edge outline) of the sub-reflector opening portion corresponds to the major diameter of the first array lens. That is, the opening portion is formed deep.

For the prevalent sub-reflector 50, since its peripheral edge shape is circular, θmax=θmin, and the utilization efficiency of light is deteriorated because the light ray 8 of up to θ2-θ3 in light ray angle is reflected by the sub-reflector 50. However, if at least θmax÷θmin>1, a portion of the light ray 8 of up to θ2-θ3 in light ray angle is not reflected by the sub-reflector, but is reflected directly by the reflector 2, so that the improvement in the utilization efficiency of light is expected in comparison with that in the conventional double reflector method.

Actually the lamp is not a point light source, but has a certain size, and the effective diameter of the first array lens 10 has an arbitrary shape. Therefore, if at least the following equation (5) is satisfied taking the points just mentioned into account, it is possible to expect an improvement in utilization efficiency of light as compared with that in the conventional double reflector method:

$$\theta max \div \theta min \geq 1.02 \quad (5)$$

Although in the example being considered the surface shape of the sub-reflector is a spherical shape, no limitation is made thereto. For example, the surface shape of the sub-reflector may be a spheroidal shape.

Figure 8:
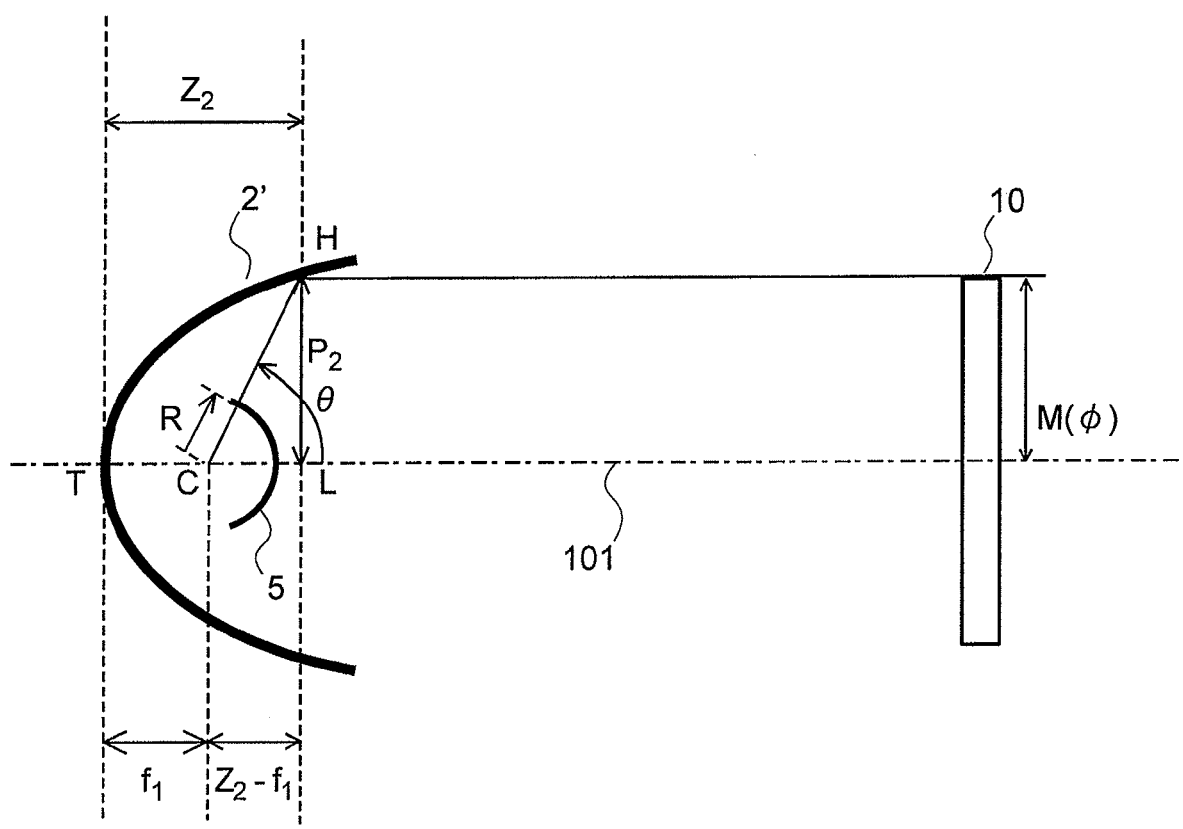
FIG. 8 is an explanatory diagram showing a peripheral edge shape of a sub-reflector according to a second embodiment.

FIG. 8 is a construction diagram of a principal portion, showing a second embodiment for determining the peripheral edge shape of a sub-reflector in the double reflector method.

FIG. 8 corresponds to the case where the reflector 2 shown in FIG. 6 is in a parabolic shape. In the same figure, a reflector 2' has a reflective surface which is in the shape of a paraboloid of revolution. A light ray reflected by the reflector 2' becomes parallel to the optical axis 101 and thus a collimator lens is not needed. As is the case with FIG. 7, the light emission center of the lamp is defined as point C and x, y, z, θ and φ coordinate axes are determined. Further, the following is assumed: A first focal length of the reflector 2 is $f_1$. The distance of a point H from the optical axis is $P_2$ at which point H the light ray passing through the outermost periphery of the sub-reflector 5 intersects the reflector 2. The foot of a perpendicular dropped from a point H to the optical axis 101 is a point L. The distance of the point L from a vertex T of the reflector 2 is $Z_2$. Lastly, an effective diameter as the distance from the center of the first array lens 10 to the outermost effective outline through which the light passes is M(φ). In this case, related parameters satisfy the following three equations (6), (7) and (8):

$$M(\phi)=P_2 \quad (6)$$

$$P_2^2=4 \times f_1 \times Z_2 \quad (7)$$

$$P_2=(Z_2-f_1)\times\tan\theta \quad (8)$$

From these three Equations (6), (7) and (8) it is possible to obtain a polar angle θ proportional to the effective diameter M(φ) of the first array lens.

As with the first embodiment, if at least the foregoing equation (5) is satisfied, it is possible to expect an improvement in utilization efficiency of light as compared with that in the conventional double reflector method.

Although in the example of FIG. 7 the lens array type shown in FIG. 3 is used as the integrator, no limitation is made thereto. The present invention is applicable also to the case where a rod lens is used as the integrator. The following description is now provided about a third embodiment of the present invention in which the invention is applied to the case where a rod lens is used as the integrator.

Figure 9:
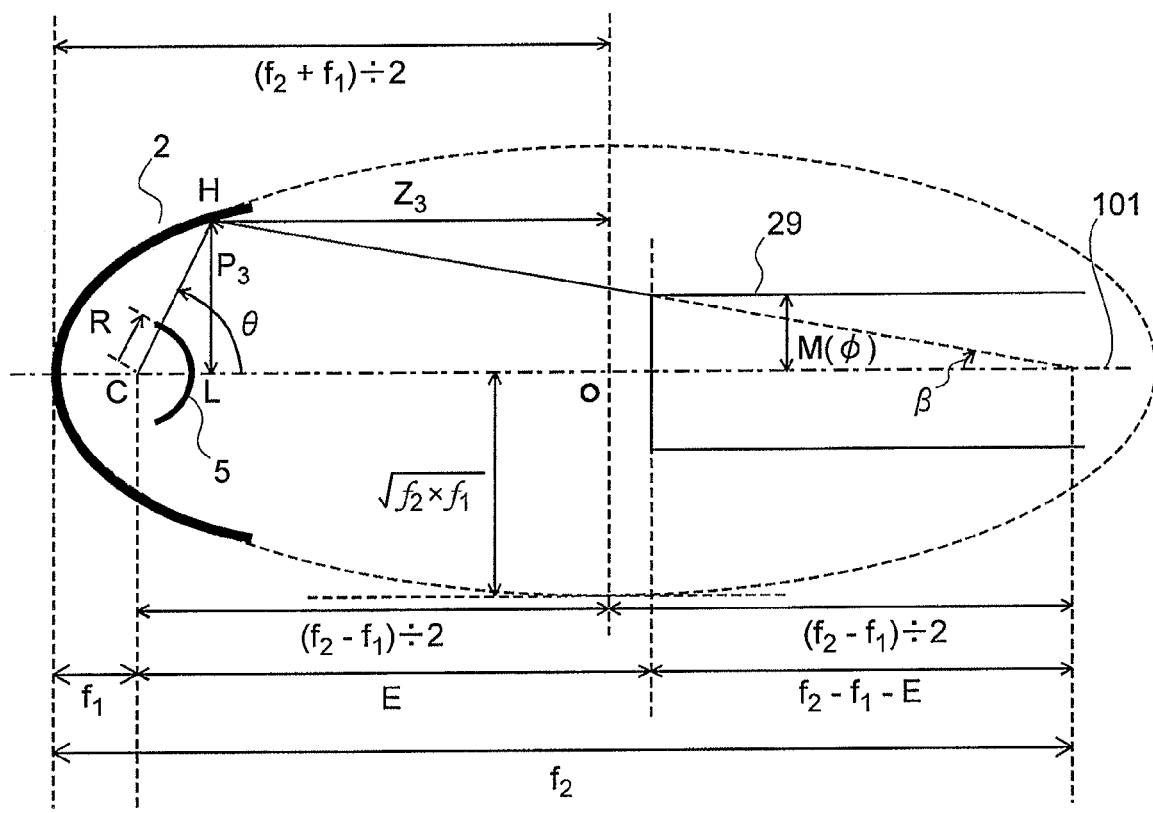
FIG. 9 is an explanatory diagram showing a peripheral edge shape of a sub-reflector according to a third embodiment.

FIG. 9 is a construction diagram of a principal portion, showing a third embodiment of the present invention for determining a peripheral edge shape of the sub-reflector in the double reflector method. In the same figure, in a case of using a rod lens as the integrator, a collimator lens is not needed and a light ray emitted from the lamp 1 and reflected by the spheroidal reflector 2 is directed as convergent light onto a rod lens 29. The light emission center of the lamp is defined as point C and x, y, z, θ and φ coordinate axes are determined as in FIG. 7. Further, the following is assumed: First and second focal lengths of the reflector 2 are $f_1$ and $f_2$, respectively, and the distance from the point C to the rod lens 29 is E. The distance of a point H from the optical axis is $P_3$ at which point H the light ray passing through the outermost periphery of the sub-reflector 5 intersects the reflector 2. The foot of a perpendicular dropped from the intersecting point H to the optical axis 101 is a point L. The distance of the point L from the ellipse origin O is $Z_3$ and the angle between the light ray reflected by the reflector 2 and the optical axis 101 is β. Lastly, an effective diameter as the distance from the center of an incident end face of the rod lens 29 to the outermost effective outline through which the light passes is M(φ). In this case, related parameters satisfy the following four equations (9), (10), (11) and (12):

$$M(\phi)=(f_2-f_1-E)\times\tan\beta \quad (9)$$

$$Z_3^2 \div \{(f_2+f_1)\div 2\}^2 + P_3^2 \div (\surd(f_2+f_1))^2=1 \quad (10)$$

$$P_3=\{(f_2-f_1)\div 2-Z_3\}\times\tan\theta \quad (11)$$

$$\sin\beta=\surd(P_3^2+\{(f_2-f_1)\div 2-Z_3\}^2)=\sin\theta\div\surd(P_3^2+\{(f_2-f_1)\div 2+Z_3\}^2) \quad (12)$$

From these four equations (9), (10), (11) and (12) it is possible to obtain a polar angle θ proportional to the effective diameter M(φ) of the rod lens 29.

As is the case with the example of FIG. 7, if at least the foregoing equation (5) is satisfied, it is possible to expect an improvement in utilization efficiency of light as compared with that in the conventional double reflector method.

The above embodiments of a first aspect of the invention can be grasped as follows: In a projection type image display apparatus comprising a light source for condensing emitted light from a lamp by a reflector, image display elements, an illuminating optical system formed by a plurality of optical elements for emitting the light from the light source to the image display elements, and a projection lens for projecting on a larger scale optical images formed by the image display elements, a reflecting film or mirror (hereinafter referred to as "sub-reflector") on a spherical surface for reflecting an emitted light component toward the reflector is provided in part of a tubular bulb portion of the lamp and a reflective surface shape of the sub-reflector is set in conformity with the effective shape of the integrator after the reflector.

By thus setting the reflective surface shape of the sub-reflector in conformity with the effective shape of the integrator after the reflector, the light ray reflected by the reflector and utilized effectively can be prevented from being reflected by the sub-reflector whose reflectance is not 100%, whereby the utilization efficiency of light can be improved.

According to a second aspect of the present invention, in the projection type image display apparatus according to the first aspect of the invention, given that the light emission center of the lamp is an origin, the optical axis direction in which the integrator is present from the origin is a z-axis, an arbitrary axis passing through the origin and perpendicular to the z-axis is a y-axis, an axis passing through the origin and running perpendicularly to the y-z plane is an x-axis, the distance from the origin to the reflecting film or mirror on the spherical surface is R, a polar angle from the z-axis to an arbitrary point of the outermost outline of the reflecting film or mirror on the spherical surface is θ, and in the x-y plane an azimuth angle from the x-axis to an arbitrary point of the outermost outline of the reflecting film or mirror on the spherical surface is φ, the shape of the reflecting film or mirror on the spherical surface can be expressed by the following three-dimensional polar coordinates:

$$x=R\times\sin\theta\times\cos\phi \quad (13)$$

$$y=R\times\sin\theta\times\sin\phi \quad (14)$$

$$z=R\times\cos\theta \quad (15),$$

wherein θ can be obtained as follows:

$$\theta=\arctan(M\div(M^2/4f1-f1))$$

Thus, a feature resides in that when a maximum value of the polar angle θ is θmax and a minimum value thereof is θmin, the following equation (16) is satisfied:

$$\theta\max\div\theta\min\geq 1.02 \quad (16)$$

By thus setting the reflective surface shape of the sub-reflector into a non-circular shape in conformity with the effective shape of the integrator after the reflector, the light ray reflected by the reflector and utilized effectively can be prevented from being reflected by the sub-reflector whose reflectance is not 100%, so that it is possible to improve utilization efficiency of light.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A projection type image display apparatus, comprising:

a lamp;

an integrator for uniforming light emitted from the lamp;

an illuminating optical system formed by a plurality of optical elements for focusing light outputted from the integrator;

an image display element for modulating the focused light;

a projection lens for projecting an optical image formed by the image display element;

a first reflector disposed in a direction opposite to the integrator as viewed from the lamp; and a second reflector disposed between the lamp and the integrator;

wherein, when a light emission center of the lamp is an origin, an optical axis direction in which the integrator is present from the origin is a z-axis, an arbitrary axis passing through the origin and running perpendicularly to the z-axis is a y-axis, an axis passing through the origin and running perpendicularly to a y-z plane is an x-axis, a polar angle from the z-axis to an arbitrary point of the outermost outline of the second reflector is θ, an azimuth angle from the x-axis to an arbitrary point of the outermost outline of the second reflector from the x-axis an x-y plane is φ, and a maximum value and a minimum value of the polar angle θ are $\theta_{max}$ and $\theta_{min}$, respectively, the following relationship is satisfied:

$\theta_{max} \div \theta_{min} \geq 1.02$; and wherein a peripheral edge shape of the second reflector is determined based on the following formulas:

$$M(\phi)=(f_2-f_1-D)\times\tan\beta \quad (1)$$

$$Z_1^2 \div \{(f_2+f_1)\div 2\}^2 + P_1^2 \div (\surd(f_2+f_1))^2 = 1 \quad (2)$$

$$P_1=\{(f_2-f_1)\div 2-Z_1\}\times\tan\theta \quad (3)$$

$$\sin\beta=\surd(P_1^2+\{(f_2-f_1)\div 2-Z_1\}^2=\sin\theta\div\surd(P_1^2+\{(f_2-f_1)\div 2+Z_1\}^2) \quad (4)$$

where:

$f_1$ represents at focal length of the second reflector relative to the first reflector;

$f_2$ represents a focal length of the second reflector relative to the optical axis;

D represents a distance from a light emission center of the lamp to the collimator lens;

$P_1$ represents a distance from the optical axis to a designated point at which the light ray passing through an outermost periphery of the second reflector intersects the first reflector;

$Z_1$ represents a distance from an ellipse origin of the first reflector relative to the designated point;

β represents an angle between the light ray reflected at the designated point and the optical axis;

M(φ) represents an effective diameter of the integrator; and

θ represents a polar angle proportional to the effective diameter M(φ) of the integrator.

2. A projection type image display apparatus according to claim 1, wherein the first reflector is a spheroid and the second reflector is a spherical body.

3. A light source unit adapted to a projection type image display apparatus, the projection type image display apparatus comprising:

an integrator for uniforming light;

an illuminating optical system formed by a plurality of optical elements for focusing light outputted from the integrator;

an image display element for modulating the focused light; and a projection lens for projecting an optical image formed by the image display element;

the light source unit comprising:

a lamp;

a first reflector disposed in a direction opposite to the integrator as viewed from the lamp; and a second reflector disposed in a direction opposite to the first reflector with respect the lamp;

wherein the second reflector is provided with an opening formed in a curved surface opposed to the lamp, and having a polar angle θ; and wherein a peripheral edge shape of the second reflector is determined based on the following formulas:

$$M(\phi)=(f_2-f_1-D)\times\tan\beta \quad (1)$$

$$Z_1^2 \div \{(f_2+f_1)\div 2\}^2 + P_1^2 \div (\surd(f_2+f_1))^2 = 1 \quad (2)$$

$$P_1=\{(f_2-f_1)\div 2-Z_1\}\times\tan\theta \quad (3)$$

$$\sin\beta=\surd(P_1^2+\{(f_2-f_1)\div 2-Z_1\}^2=\sin\theta\div\surd(P_1^2+\{(f_2-f_1)\div 2+Z_1\}^2) \quad (4)$$

where:

$f_1$ represents a focal length of the second reflector relative to the first reflector;

$f_2$ represents a focal length of the second reflector relative to the optical axis;

D represents a distance from a light emission center of the lamp to the collimator lens;

$P_1$ represents a distance from the optical axis to a designated point at which the light ray passing through an outermost periphery of the second reflector intersects the first reflector;

$Z_1$ represents a distance from an ellipse origin of the first reflector relative to the designated point;

β represents an angle between the light ray reflected at the designated point and the optical axis;

M(φ) represents an effective diameter of the integrator; and

θ represents the polar angle proportional to the effective diameter M(φ) of the integrator.

4. A light source unit according to claim 3, wherein the opening of the second reflector becomes long at a place of the same azimuth angle as the angle between a major angle of the integrator and an optical axis.

5. A light source unit according to claim 3, wherein, when an effective shape of the integrator is a rectangular shape, a notched portion is formed at an azimuth angle of the same angle as the angle between a diagonal line of the integrator and an optical axis of the integrator.

6. A light source unit according to claim 3, wherein the first reflector is a spheroid and the second reflector is a spherical body.

7. A light source unit according to claim 6, wherein a polar angle $\theta_{min}$ of an azimuth angle corresponding to a major diameter of the integrator and a polar angle $\theta_{max}$ of an azimuth angle corresponding to a minor diameter of the integrator satisfy the relationship of $\theta_{max} \div \theta_{min} \geq 1.02$.

* * * * *